US008973702B2

(12) United States Patent
Gresillon (10) Patent No.: US 8,973,702 B2
(45) Date of Patent: Mar. 10, 2015

(54) VOLUMETRIC PIEZOELECTRIC SEISMIC WAVE SOURCE AND RELATED METHODS

(71) Applicant: CGG Services SA, Massy Cedex (FR)

(72) Inventor: Francois-Xavier Gresillon, Rully (FR)

(73) Assignee: CGG Services SA, Massy Cedex (FR)

( * ) Notice: Subject to any disclaimer, the term of this patent is extended or adjusted under 35 U.S.C. 154(b) by 0 days.

(21) Appl. No.: 13/972,183

(22) Filed: Aug. 21, 2013

(65) Prior Publication Data

US 2014/0086012 A1   Mar. 27, 2014

(30) Foreign Application Priority Data

Sep. 26, 2012 (FR) ...................................... 12 59059

(51) Int. Cl.
*G01V 1/42* (2006.01)
*G01V 1/52* (2006.01)
*H04R 17/10* (2006.01)
*G01V 1/02* (2006.01)
*G01V 1/40* (2006.01)
*H04R 17/00* (2006.01)

(52) U.S. Cl.
CPC .. *G01V 1/159* (2013.01); *G01V 1/40* (2013.01)
USPC .......................................... 181/104; 367/159

(58) Field of Classification Search
USPC ........... 181/104, 106, 111; 367/189, 159, 157
See application file for complete search history.

(56) References Cited

U.S. PATENT DOCUMENTS

| 3,583,677 A | 6/1971 | Phillips |
| 3,739,326 A * | 6/1973 | Kerr et al. ..................... 367/159 |
| 3,854,060 A * | 12/1974 | Cook ............................. 310/326 |
| 3,939,467 A * | 2/1976 | Cook et al. .................... 367/155 |
| 4,035,886 A | 7/1977 | Gluck |
| 4,420,826 A * | 12/1983 | Marshall et al. .............. 367/167 |
| 4,651,044 A | 3/1987 | Kompanek |
| 4,682,308 A * | 7/1987 | Chung ............................ 367/31 |
| 4,700,803 A * | 10/1987 | Mallett et al. ................. 181/106 |
| 4,789,968 A * | 12/1988 | Rice ................................ 367/20 |
| 4,876,675 A * | 10/1989 | Ogura et al. ................... 367/155 |
| RE33,472 E * | 12/1990 | Chung ............................ 367/31 |
| 5,027,331 A * | 6/1991 | Winbow et al. ................. 367/75 |

(Continued)

FOREIGN PATENT DOCUMENTS

| FR | 2834074 A1 | 6/2003 |
| FR | 2845164 A1 | 4/2004 |
| WO | 2004/029661 A1 | 4/2004 |

OTHER PUBLICATIONS

French Preliminary Report and Written Opinion issued in related French Application No. 1259059 dated Jun. 20, 2013.

*Primary Examiner* — Edgardo San Martin
(74) *Attorney, Agent, or Firm* — Patent Portfolio Builders PLLC (57) ABSTRACT

Seismic wave sources and related methods are provided. A seismic wave source includes a housing, plural pillars and an excitation system. The housing is split in two halves along a plane including a longitudinal axis of the housing. The plural pillars are made of piezoelectric elements and are positioned inside the housing to have one end in contact with a semi-cylindrical middle portion of one half of the housing and another end in contact with a semi-cylindrical middle portion of the other half of the housing. The excitation system connected by wires to the plural pillars and is configured to provide electrical signals to the piezoelectric elements. Upon receiving the electrical signals from the excitation system, the pillars generate forces on the housing thereby generating seismic waves.

20 Claims, 6 Drawing Sheets

(56) References Cited

U.S. PATENT DOCUMENTS

| | | | |
|---|---|---|---|
| 5,103,130 A * | 4/1992 | Rolt et al. | 310/337 |
| 5,214,614 A * | 5/1993 | Baule | 367/58 |
| 5,291,461 A * | 3/1994 | Boeglin et al. | 367/163 |
| 5,363,346 A * | 11/1994 | Maltby | 367/163 |
| 5,376,859 A | 12/1994 | Kim et al. | |
| 5,412,621 A * | 5/1995 | Hepp | 367/154 |
| 5,477,101 A * | 12/1995 | Ounadjela | 310/334 |
| 5,646,470 A * | 7/1997 | de Groot | 310/337 |
| 5,774,423 A * | 6/1998 | Pearce et al. | 367/157 |
| 5,852,589 A * | 12/1998 | Wilson et al. | 367/157 |
| 6,002,648 A * | 12/1999 | Ambs | 367/159 |
| 6,108,274 A * | 8/2000 | Pearce | 367/157 |
| 6,496,448 B1 * | 12/2002 | Kompanek | 367/157 |
| 6,643,222 B2 * | 11/2003 | Osborn et al. | 367/174 |
| 7,104,357 B2 * | 9/2006 | Baroni et al. | 181/121 |
| 7,239,066 B2 | 7/2007 | Ott et al. | |
| 7,420,879 B2 | 9/2008 | Meynier et al. | |
| 7,441,628 B2 * | 10/2008 | Minto | 181/111 |
| 7,679,266 B2 * | 3/2010 | Porzio et al. | 310/323.02 |
| 7,894,307 B2 * | 2/2011 | Osborn et al. | 367/169 |
| 2005/0067215 A1 | 3/2005 | Meynier et al. | |
| 2007/0126315 A1 | 6/2007 | Scott | |
| 2009/0051248 A1 | 2/2009 | Porzio et al. | |
| 2014/0269203 A1 * | 9/2014 | Jones et al. | 367/135 |

* cited by examiner

VOLUMETRIC PIEZOELECTRIC SEISMIC WAVE SOURCE AND RELATED METHODS

BACKGROUND

1. Technical Field

Embodiments of the subject matter disclosed herein generally relate to devices and methods for generating seismic waves in an underground formation and, more particularly, to mechanisms and techniques for generating seismic waves with volumetric piezoelectric sources.

2. Discussion of the Background

Seismic wave sources may be used to generate seismic waves in underground formations for investigating the underground structure based on seismic images formed from reflections of the seismic waves at interfaces between formation layers that have different acoustic properties. The reflections are detected by seismic receivers. A seismic survey investigating the underground structure may be performed on land or water.

Focusing now on land seismic sources, in early such sources, a force was applied to the formation through a bell-shaped mass attached to the top of a pillar, the pillar being mounted on a metal plate resting directly on the formation or bolted to a concrete slab (i.e., a coupled reactive mass). This type of coupling was abandoned because of inadequate repeatability of the seismic waves obtained for a surface source, even when fixed on a concrete slab, partly due to variations in temperature and humidity in the weathering zone (WZ). Another reason for abandoning this arrangement was that while the energy delivered peaks around 80-100 Hz (depending on the mass), it decays abruptly at low frequencies.

Figure 1:
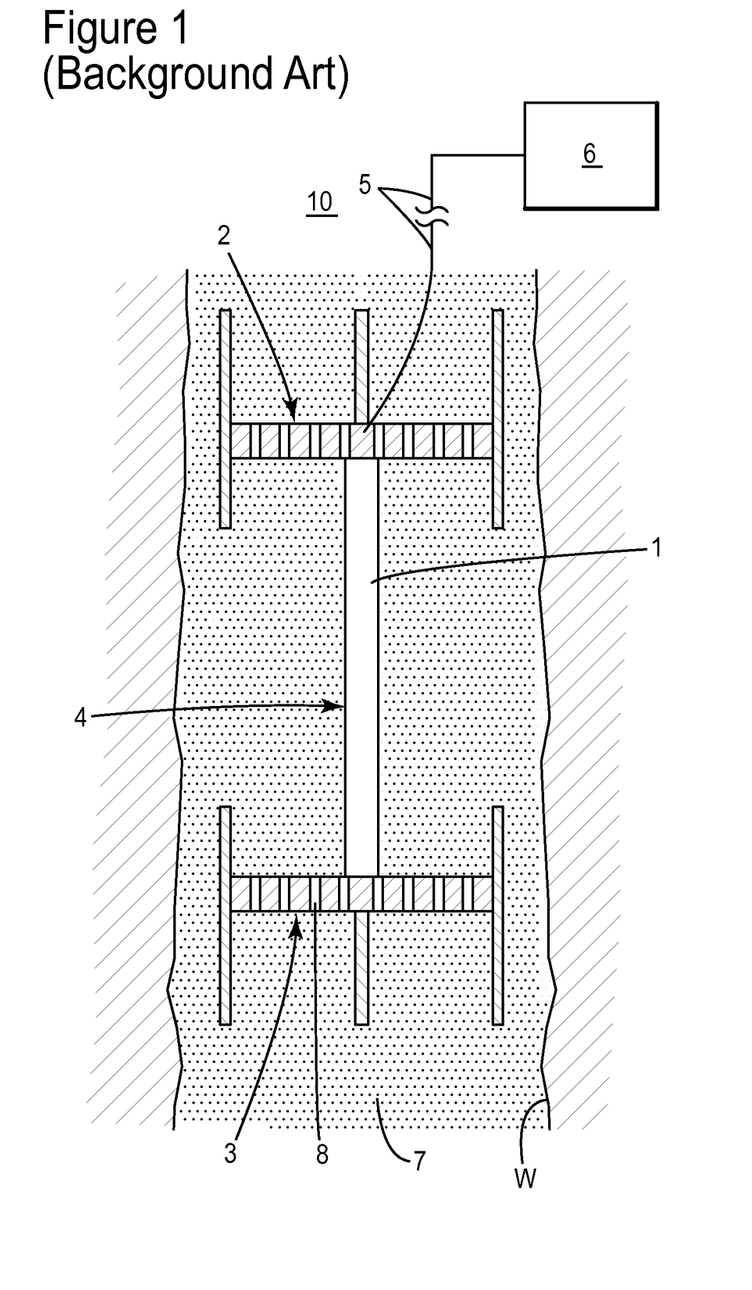
FIG. 1 is a schematic diagram of a conventional seismic wave source.

A conventional seismic wave source 10 (described in U.S. Pat. No. 7,420,879 to Meynier et al.) is illustrated in FIG. 1. The source 10 includes plural vibrators (electromechanical, electromagnetic, hydraulic, piezoelectric, magnetostrictive, etc.) forming a pillar 1 in contact with plates 2 and 3. A force is applied to the formation by the pillar 1 via the plates 2 and 3, thereby generating a seismic wave.

The pillar 1, which is covered with a deformable membrane 4, is connected by a cable 5 to a signal generator 6. The source 10 is placed in a cavity or well W, for example, of 15 to 20 cm in diameter, at a desired depth under the WZ, usually between 20 and 200 m. A coupling material 7, such as cement or concrete, is injected into the well to be in direct contact with pillar 1 over the total length thereof and with the plates 2 and 3. In order to allow the coupling material 7 to be homogeneously distributed in the space between plates 2 and 3, the plates may have perforations 8. The diameter of plates 2 and 3 must correspond substantially to the diameter of the cavity or well W so as to achieve maximum coupling surface area.

The signal generator 6 generates an excitation signal in a frequency sweep or a single frequency, causing elements forming the pillar 1 to expand or contract temporarily along the pillar's longitudinal axis.

The metal plates 2 and 3 are mounted on the pillar ends to improve the coupling of the pillar 1 with the coupling material 7. The coupling material 7 intermediates the coupling between the source and the formation. For example, the plates 2 and 3 have a thickness of 10 cm and a diameter of 10 cm. The pillar 1 has a length exceeding 80 cm. The membrane 4 may be made of polyurethane and surround the pillar 1 to decouple it from the coupling material (cement) 7. Thus, only the end portions of the pillar 1 and the plates 2 and 3 are coupled with the coupling material (cement) 7. Upon receiving an excitation (electrical signal) from the signal generator 6, the source 10 generates forces along the pillar's longitudinal axis. This conventional source provides good repeatability and high reliability, once a good coupling is accomplished.

A typical pillar has a cylindrical shape with a radius of 5 cm and a length of 95 cm. This pillar may consist of 120 ceramics made, for example, of lead-zirconate-titanate (PZT) known under the commercial name NAVY type I. Each ceramic may have a ring shape with 20 mm internal diameter, 40 mm external diameter and 4 mm thickness. The maximum length expansion obtainable for this pillar in the absence of constraints is 120 μm, corresponding to a volume change of about 1000 mm$^3$. The electrical signals fed to the pillars have 5-300 Hz, 2500 V peak maximum and 2 A peak maximum.

However, the conventional source has the disadvantage of producing a large amount of energy corresponding to transverse waves (i.e., S-waves, in which the displacement of the medium is perpendicular to the direction of wave propagation) relative to the energy corresponding to the more desirable longitudinal waves (i.e., P-waves, in which the displacement of the medium is parallel to the direction of wave propagation, and the P-waves propagation speed is nearly twice the S-waves propagation speed). Another disadvantage is related to the source's repeatability and reliability. It depends on the impedance adaptation between the source, the coupling material and the formation. Due to the strong impedance of the source and the low generated displacements, the best efficiency is obtained when the source is coupled in a hard environment with cement. Therefore, a conventional source is not necessarily suitable for very soft formations. Yet another disadvantage is that the radiation pattern of the conventional source (long pillar of ceramics) is adapted for vertical wells but not for horizontal wells.

Thus, there is a need to develop a seismic source capable of generating seismic waves carrying a larger fraction of the energy as P-waves than conventional sources, better adapted to soft formations and/or suitable for deployment in horizontal wells.

BRIEF SUMMARY OF THE INVENTION

A seismic wave source to be operated in a well inside a formation is configured to reduce energy carried by the S-waves relative to the P-waves and, thus, to increase the amount of energy of seismic waves used for evaluating the formation's structure based on reflections of the seismic waves. This source is also better adapted for horizontal wells.

According to an exemplary embodiment, a seismic wave source for generating seismic waves includes a housing, plural pillars inside the housing, and an excitation system. The housing is split in two halves along a plane including a longitudinal axis of the housing. The plural pillars are made of piezoelectric elements and are positioned to have one end in contact with a semi-cylindrical middle portion of one of the two halves of the housing and another end in contact with a semi-cylindrical middle portion of the other one of the two halves of the housing. The excitation system is connected by wires to the plural pillars and is configured to provide electrical signals to the piezoelectric elements. Upon receiving the electrical signals from the excitation system, the pillars generate forces on the housing thereby generating the seismic waves.

According to another embodiment, a method for generating seismic waves in a formation includes placing a seismic wave source inside a hole drilled in the formation, filling the space around the housing with a coupling material, and providing electrical signals to piezoelectric elements of pillars in the source. The source includes (A) a housing split in two halves along a plane including a longitudinal axis of the housing, (B) plural pillars made of piezoelectric elements positioned inside the housing with one end in contact with a semi-cylindrical middle portion of one of the two halves of the housing and another end in contact with a semi-cylindrical middle portion of the other one of the two halves of the housing, and (C) an excitation system connected by wires to the pillars and configured to provide electrical signals to the piezoelectric elements. The longitudinal axis of the housing is substantially parallel to a drilling direction of the hole.

According to another embodiment, a seismic wave source configured to be lowered in a well comprises plural piezoelectric elements arranged at multiple locations along an insertion direction to generate forces in a plane substantially perpendicular to the insertion direction.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic source used to perform a seismic survey to evaluate the structure of a solid formation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Seismic wave sources, according to various embodiments, are configured to be inserted in a well (along the well's drilling direction) and include a plurality of piezoelectric elements arranged to generate forces at multiple locations along the drilling direction, the forces being substantially perpendicular to the drilling direction. Some of these seismic wave sources have the advantage of reducing the energy carried by the S-waves relative to the energy carried by the P-waves and are better suited for use in horizontal wells because the directivity of the P-waves toward the target (i.e., the formation) is increased. Moreover processing and interpreting P-waves is preferred to processing and interpreting S-waves.

The sources configured to be inserted in a well are often designated as land sources. However, a person of skill in the art would understand that such a designation is not a limitation, being possible to use such a source by placing it in a well drilled in a formation under the seabed.

Figure 2:
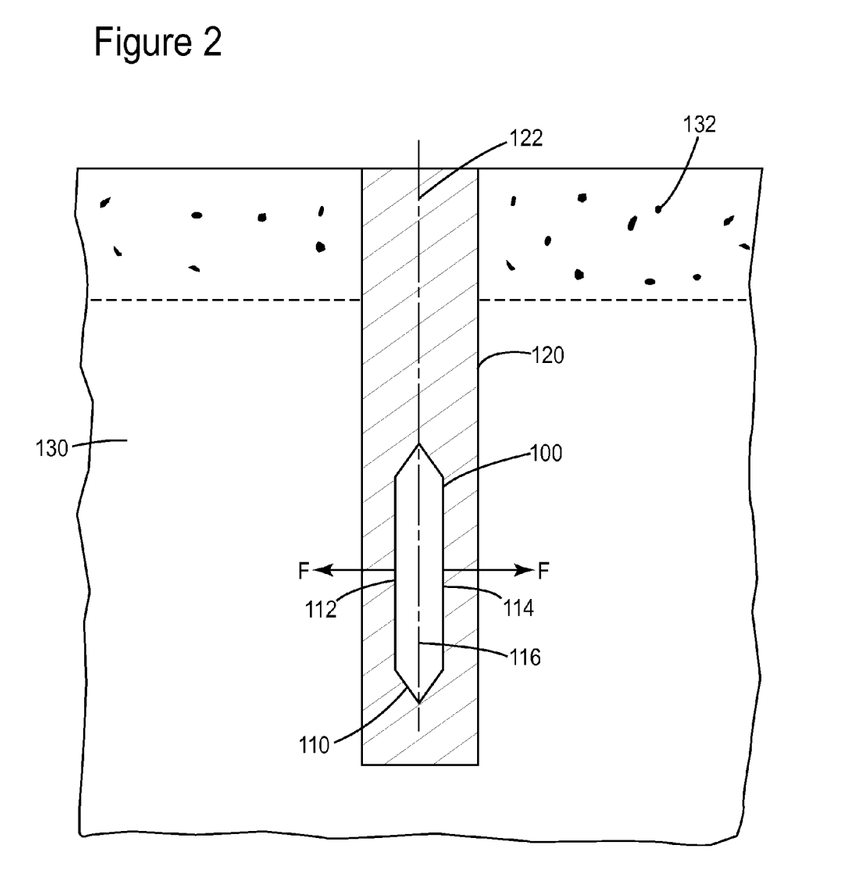
FIG. 2 is a schematic diagram of a seismic wave source according to an exemplary embodiment.

FIG. 2 is a schematic diagram of a seismic wave source 100 according to an exemplary embodiment. The source 100 has a housing 110 split in two halves 112 and 114 by a plane including a longitudinal axis 116. This seismic source 100 is placed in a well 120 drilled in a formation 130 such that the longitudinal axis 116 is substantially parallel to the drilling direction 122 of the well 120. The source 100 is placed below the weathering zone and an unconsolidated layer 132 to avoid the source being affected by meteorological conditions (i.e., humidity, temperature, surface water, etc.).

Figure 3:
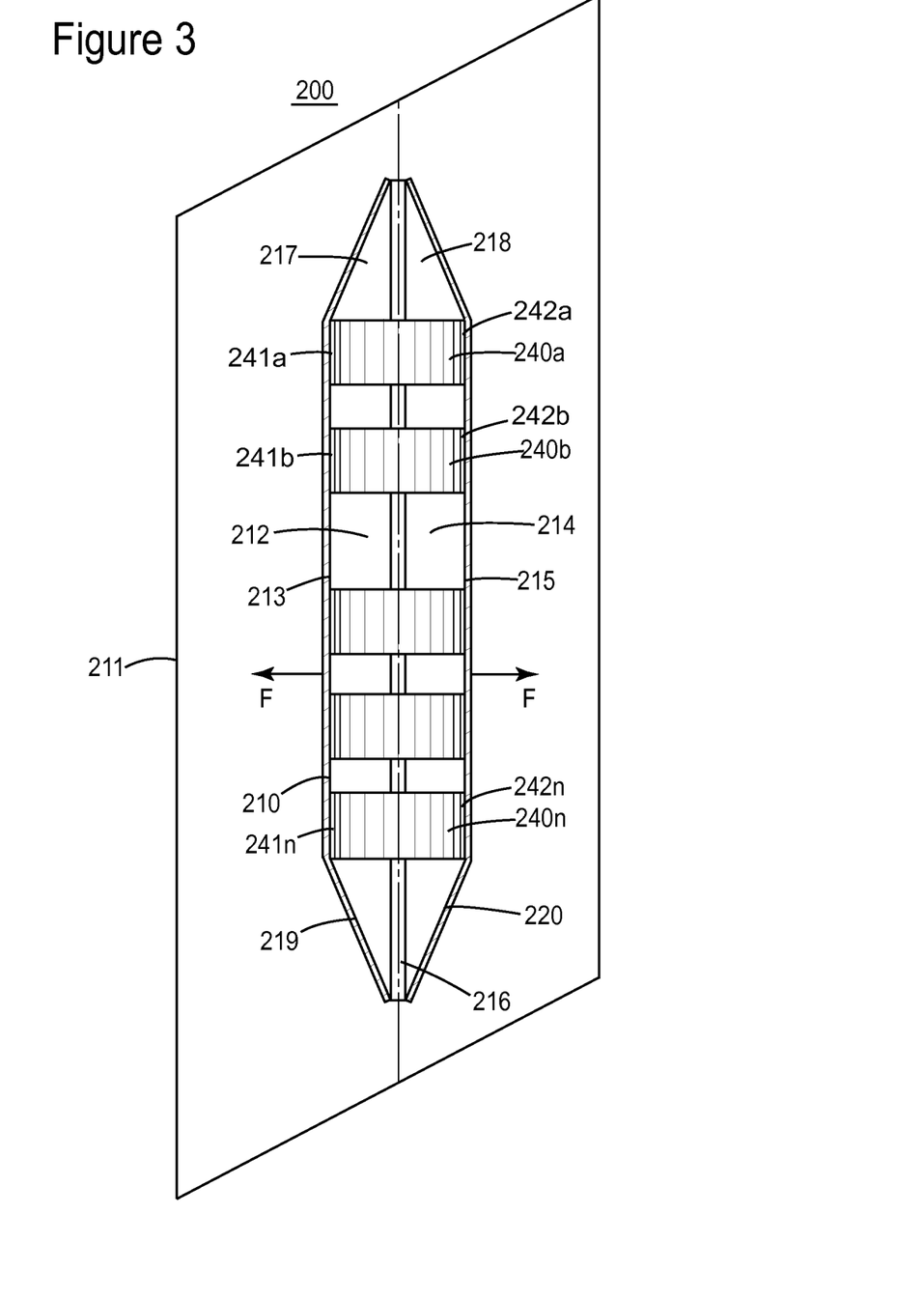
FIG. 3 is a schematic diagram of a seismic wave source according to another exemplary embodiment.

FIG. 3 shows a cross-section of a land seismic source 200 (which is similar to the source 100) in a plane including the source's longitudinal axis 216 according to another exemplary embodiment. Each of the two halves 212 and 214 of the housing 210 has a semi-cylindrical middle portion 213 or 215, respectively. The halves 212 and 214 may taper off at the ends along the longitudinal direction in conical shapes 217, 218, 219 and 220. The two halves 212 and 214 of the housing 210 may be made of metal or other appropriate materials.

Inside the housing 210, plural pillars 240a, 240b, ..., 240n made of piezoelectric elements are arranged substantially perpendicular to the plane including the longitudinal axis 216. One end (e.g., 241a, 241b, ..., 241n) of each pillar is in contact with the semi-cylindrical middle portion 213, and the other end (e.g., 242a, 242b, ..., 242n) of the pillar is in contact with the semi-cylindrical middle portion 215. The ends (e.g., 241a, 241b, ..., 241n, 242a, 242b, ..., 242n) of the pillars (e.g., 240a, 240b, ..., 240n) may be fixedly attached to the respective semi-cylindrical portion (e.g., glued) or may be only maintained in a fixed position (e.g., using pre-stressing rods, not shown) while the source is active. The ends (e.g., 241a, 241b, ..., 241n, 242a, 242b, ..., 242n) of the pillars 240a, 240b, ..., 240n are positioned such that to enable applying forces F to the formation 130. In one embodiment, the pillars may be arranged such that elongation axes of at least two pillars to have an angular offset in a plane perpendicular to the longitudinal axis 216.

In order to be usable inside typical drilling holes, the housing's diameter (perpendicular to the drilling direction) is preferably less than 20 cm. The two semi-cylindrical middle portions preferably have a length much shorter than the seismic wavelength, e.g., between 0.5 and 5 m.

Figure 4A:
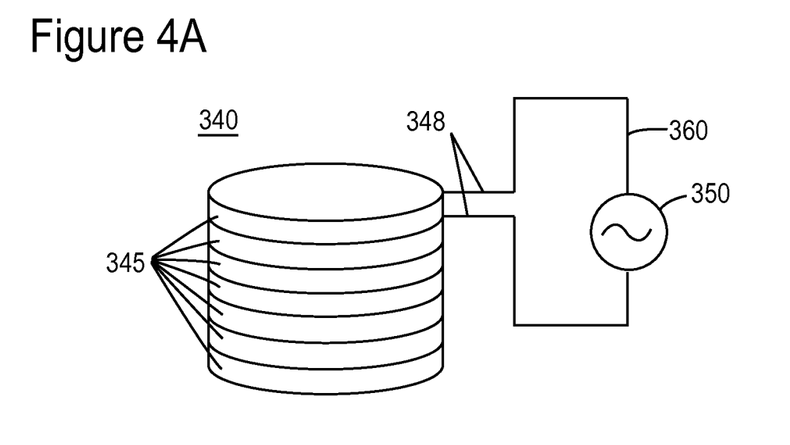
FIGS. 4A and 4B are schematic diagrams of pillars of seismic wave sources according to exemplary embodiments.

FIGS. 4A and 4B illustrate in more detail alternative structures of the pillars. In FIG. 4A, the pillar 340 is made of disk or ring piezoelectric elements 345. Electrodes 348 are connected between the piezoelectric elements 345 to enable applying the electrical excitation signals generated by a signal generator 350. The pillar 340 is in fact a layered sequence of piezoelectric elements and electrodes (only a pair shown). The electrical excitation signals are transmitted via wires 360 to the electrodes 348.

Figure 4B:
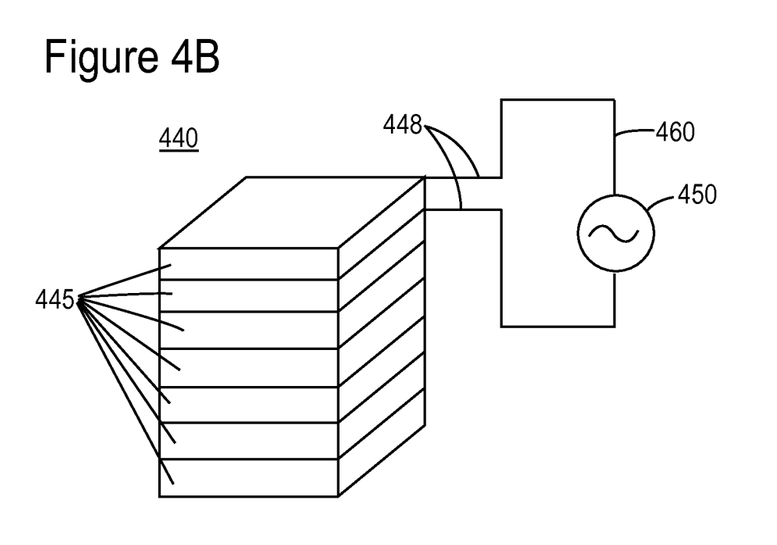

In FIG. 4B, the pillar 440 is made of rectangular piezoelectric elements 445. Electrodes 448 are placed between the piezoelectric elements 445 to enable applying the electrical excitation signals generated by a signal generator 450. The pillar 440 is also a layered sequence of piezoelectric elements and electrodes (only a pair of which are shown). The electrical excitation signals are transmitted via wires 460 to the electrodes 448. In other embodiments, the piezoelectric elements may have shapes other than those illustrated in FIGS. 4A and 4B.

Figure 5:
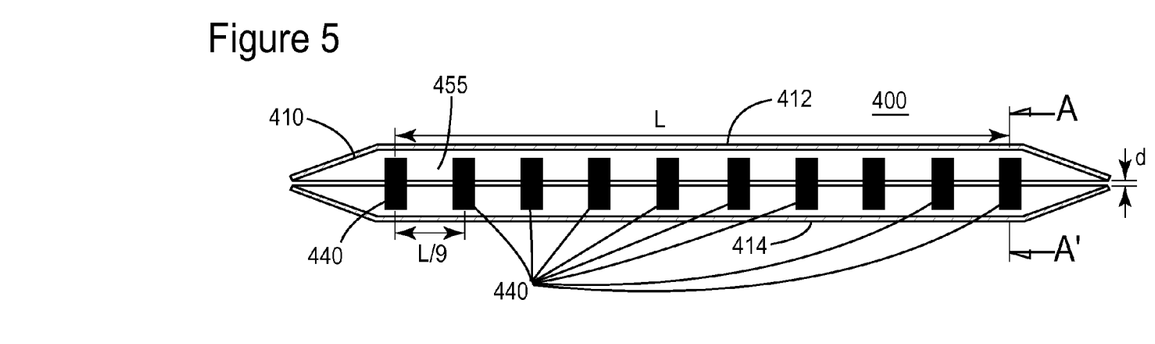
FIG. 5 is a schematic diagram of a seismic wave source according to another exemplary embodiment.

FIG. 5 illustrates a seismic source 400 having a body 410 according to another exemplary embodiment. The semi-cylindrical middle portions 412 and 414 of the housing 410 have a length of L=2 m and a radius R=5 cm. Inside the housing are ten pillars 440, each including 12 ceramics. The pillars 440 expand upon applying the electrical excitation signal, causing a volume change of about 2500 mm$^3$. The pillars 440 may be equally spaced along the longitudinal axis of the housing, to have a distance equal to L/9 between neighboring pillars. Compared to the conventional seismic source, the configuration of the source 400 allows a larger variation of the volume enclosed by the housing associated with a lower physical displacement and, thus, lower shear energy loss. Moreover, a seismic source with variable volume like the source 400 may be compatible with a flexible coupling and, thus, is easier to use inside a soft formation.

The mechanical impedance Z of the source is determined by the product of the mass corresponding to the displaced volume and sound velocity. The capacity to adjust the source's impedance favors source/cement/formation coupling, leading to better energy transmission from the seismic source to the formation. The source's impedance may be varied by adjusting the longitudinal distance between pillars. The larger the longitudinal distance between pillars, the more flexible the source and easier to adjust to couple to soft formations. In hard formations like limestone, the distance between the pillars may be reduced.

The length of each pillar 440 may be about 6 cm. Each pillar 440 may have one end in contact with the semi-cylindrical portion of one of the halves 412 and 414, and the other end in contact with the semi-cylindrical portion of the other one of the halves 412 and 414 of the housing 410. The pillars 440 may be mounted inside the semi-cylindrical portions via pre-stressing rods. A space of d=1 mm may be left in between the halves 412 and 414 to allow compression of the housing 410. All the volume inside the housing 410 and between the pillars 440 may be filled with polyurethane (PU) resin 455, but no PU is applied outside the housing 410.

Figure 6:
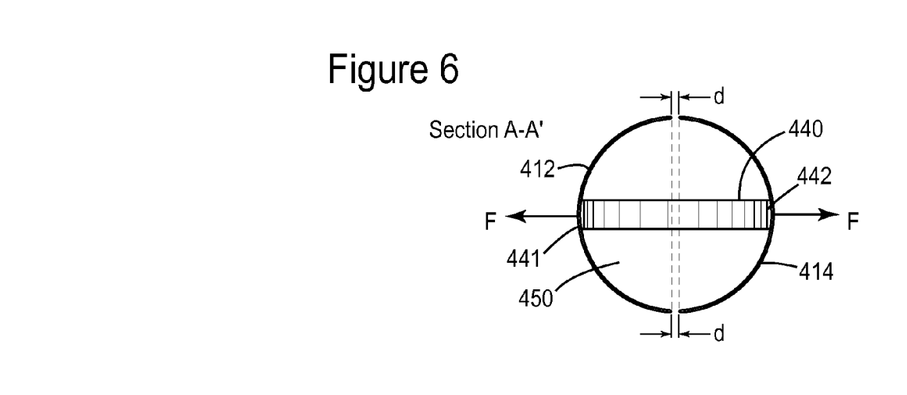
FIG. 6 is a cross-section of a seismic wave source according to an exemplary embodiment.

FIG. 6 is a cross-section A-A' perpendicular to the longitudinal axis of the housing 410, illustrating the forces F generated upon feeding an electrical excitation signal to the pillars 440 and resulting in seismic waves propagating in the surveyed formation.

The electrical signals fed to the pillars may have 5-300 Hz, 2500 V peak maximum and 2 A peak maximum. The excitation system providing electrical signals to the piezoelectric elements may include a signal generator and cables carrying electrical signals to the pillars. The signal generator may be located at the top of the well.

In one embodiment, the excitation system generates signals having a predetermined frequency. In another embodiment, the excitation system generates a signal sweeping a predetermined range of frequencies. In some embodiments, the excitation system generates trains of signals at predetermined time intervals.

Figure 7:
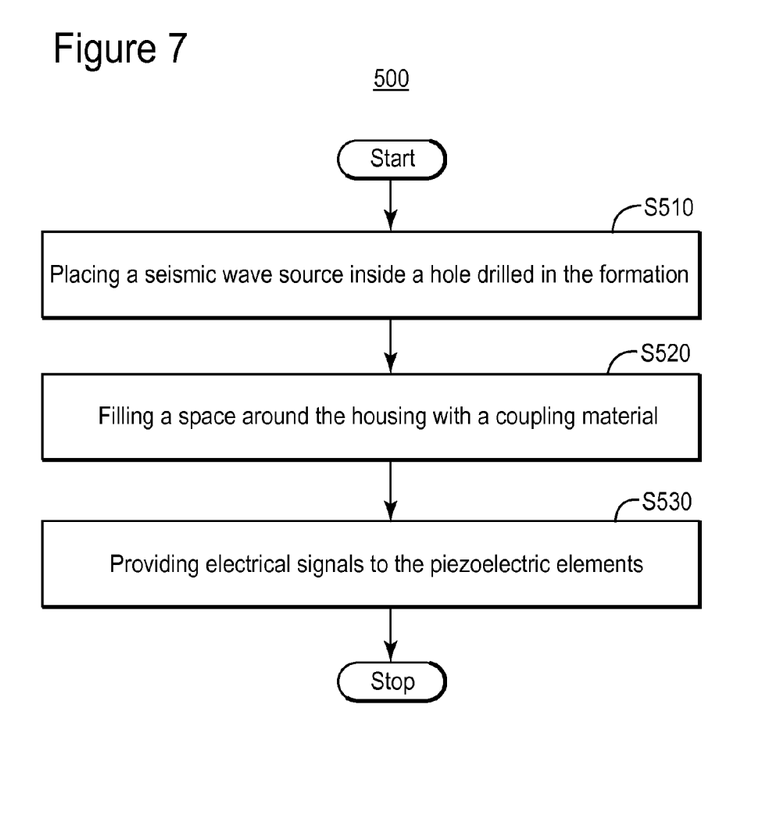
FIG. 7 is a flowchart of a method for generating seismic waves in a formation according to another exemplary embodiment.

A flow diagram of a method 500 for generating seismic waves in a formation according to an exemplary embodiment is illustrated in FIG. 7. The method first includes placing a seismic wave source inside a hole drilled in the formation at S510. The source has (A) a housing split in two halves along a plane including a longitudinal axis of the housing, (B) plural pillars made of piezoelectric elements that are positioned inside the housing to have one end in contact with a semi-cylindrical portion of one half of the housing and another end in contact with a semi-cylindrical portion of the other half of the housing, and (C) an excitation system configured to provide electrical signals to the piezoelectric elements. The longitudinal axis of the housing may be substantially parallel to a drilling direction of the hole.

The method 500 further includes filling a space around the housing with a coupling material, at S520, and providing electrical signals to the piezoelectric elements, at S530. Upon receiving electrical signals from the excitation system, the pillars generate forces toward the outside of the housing, resulting in seismic waves.

The coupling material used at S520 may be cement but, in a different embodiment, may be a material other than cement.

The source's piezoelectric elements placed at S510 may have substantially the same shape, which may be a disk, a ring or a rectangle. The source may include several pillars (e.g., 10 pillars). The pillars may be substantially parallel to one another. The pillars may be arranged at substantially equal distances along the longitudinal axis.

The source's excitation system may include a signal generator and cables carrying electrical signals to the pillars. In one embodiment, the excitation system may generate a signal having a predetermined frequency. In another embodiment, the excitation system may generate a signal sweeping a predetermined range of frequencies. Yet in another embodiment, the excitation system may generate trains of signals at predetermined time intervals.

The source's housing placed at S510 may have at least one end tapering off along the longitudinal axis into a conical shape.

In one embodiment, at S510, the seismic wave source may be placed inside the hole at a predetermined depth at which the formation is not affected by meteorological conditions.

Method 500 may further include (A) placing a plurality of seismic wave detectors at various positions relative to the source, (B) acquiring reflections of seismic waves in the plurality of seismic wave detectors, and (C) extracting information about the structure of the formation based on the acquired reflections.

In contrast to the conventional source in which the pillar's expansion causes P-waves for the material (formation) above and below the plates, S-waves being produced only as a consequence of vertical constraint, in embodiments illustrated in FIGS. 2-6, the pillars expand perpendicular to the drilling direction of the well, for a smaller distance than the conventional pillar, and the force applied to distal portions of the housing decreases due to the tapering off along the longitudinal axis into a conical shape. Therefore, the energy carried by the S-waves is reduced relative to the energy carried by the P-waves and, increasing the amount of energy of seismic waves (P-waves) used for evaluating the formation's structure.

The disclosed exemplary embodiments provide seismic wave sources and related methods for generating seismic waves in a formation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic wave source for generating seismic waves, comprising:
   a housing split in two halves along a plane including a longitudinal axis of the housing, wherein one of the two halves is separated along the entire longitudinal axis from another one of the two halves by a predetermined distance so that ends of the two halves move one relative to another;
   plural pillars made of piezoelectric elements and positioned inside the housing to have one end in contact with a semi-cylindrical middle portion of one of the two halves of the housing and another end in contact with a semi-cylindrical middle portion of the other one of the two halves of the housing; and
   an excitation system connected by wires to the plural pillars and configured to provide electrical signals to the piezoelectric elements,
   wherein upon receiving the electrical signals from the excitation system, the pillars generate forces on the housing thereby generating the seismic waves.

2. The source of claim 1, wherein each of the pillars is made of a sequence of piezoelectric elements and electrodes.

3. The source of claim 2, wherein the piezoelectric elements have substantially the same shape.

4. The source of claim 3, wherein the shape of the piezoelectric elements is one of a disk, a ring or a rectangle.

5. The source of claim 1, wherein a volume inside the housing is filled with polyurethane.

6. The source of claim 1, wherein the pillars are arranged at substantially equal distances along the longitudinal axis.

7. The source of claim 1, wherein elongation axes of at least two of the pillars have an angular offset there-between in a plane perpendicular to the longitudinal axis.

8. The source of claim 1, wherein the excitation system generates signals having a predetermined frequency.

9. The source of claim 1, wherein the excitation system generates signals sweeping a predetermined range of frequencies.

10. The source of claim 1, wherein the excitation system generates trains of signals at predetermined time intervals.

11. The source of claim 1, wherein the housing has at least one end tapering off along the longitudinal axis into a conical shape.

12. A method for generating seismic waves in a formation, the method comprising:
   placing a seismic wave source inside a hole drilled in the formation, the source including (A) a housing split in two halves along a plane including a longitudinal axis of the housing, wherein one of the two halves is separated along the entire longitudinal axis from another one of the two halves by a predetermined distance so that ends of the two halves move one relative to another, (B) plural pillars made of piezoelectric elements and positioned inside the housing to have one end in contact with a semi-cylindrical middle portion of one of the two halves of the housing and another end in contact with a semi-cylindrical middle portion of the other one of the two halves of the housing, and (C) an excitation system connected by wires to the pillars and configured to provide electrical signals to the piezoelectric elements, wherein the longitudinal axis of the housing is substantially parallel to a drilling direction of the hole;
   filling a volume around the housing with a coupling material; and
   providing electrical signals to the piezoelectric elements, wherein upon receiving the electrical signals from the excitation system, the pillars generate forces on the housing thereby generating the seismic waves.

13. The method of claim 12, wherein the coupling material is cement.

14. The method of claim 12, wherein the piezoelectric elements have substantially the same shape which is one of a disk, a ring or a rectangle.

15. The method of claim 12, wherein a volume inside the housing is filled with polyurethane.

16. The method of claim 12, wherein elongation axes of at least two of the pillars have an angular offset there-between in a plane perpendicular to the longitudinal axis.

17. The method of claim 12, wherein the excitation system generates a signal having a predetermined frequency or sweeping a predetermined range of frequencies, or generates trains of signals at predetermined time intervals.

18. The method of claim 12, wherein the housing has at least one end tapering off along the longitudinal axis into a conical shape.

19. The method of claim 12, further comprising:
   placing a plurality of seismic wave detectors at various positions relative to the source;
   acquiring reflections of seismic waves in the plurality of seismic wave detectors; and
   extracting information about structure of the formation based on the acquired reflections.

20. A seismic wave source configured to be inserted in a well comprises:
   a housing split in two halves along a plane including a longitudinal axis of the housing, wherein one of the two halves is separated along the entire longitudinal axis from another one of the two halves by a predetermined distance so that ends of the two halves move one relativet to another; and
   a plurality of piezoelectric elements arranged at multiple locations along an insertion direction to generate forces in a plane substantially perpendicular to the insertion direction.

* * * * *